(12) United States Patent
Haitsma et al.

(10) Patent No.: US 6,505,223 B1
(45) Date of Patent: Jan. 7, 2003

(54) WATERMARK DETECTION

(75) Inventors: Jaap A. Haitsma, Eindhoven (NL); Antonius A. C. M. Kalker, Eindhoven (NL); Adrianus J. M. Denissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/423,277

(22) PCT Filed: Mar. 2, 1999

(86) PCT No.: PCT/IB99/00359
§ 371 (c)(1),
(2), (4) Date: Nov. 4, 1999

(87) PCT Pub. No.: WO99/45707
PCT Pub. Date: Sep. 10, 1999

(30) Foreign Application Priority Data

Mar. 4, 1998 (EP) .............................................. 98200656

(51) Int. Cl.$^7$ ............................................... G06F 15/00
(52) U.S. Cl. ........................................ 708/403; 708/405
(58) Field of Search ................................. 708/400–405

(56) References Cited

U.S. PATENT DOCUMENTS 5,915,034 A      6/1999   Nakajima et al. ............ 382/124
5,933,798 A  *   8/1999   Linnartz ..................... 702/191
6,247,035 B1 *   6/2001   Hellberg ..................... 708/405
6,252,972 B1 *   6/2001   Linnartz ..................... 382/100
6,266,687 B1 *   7/2001   Leyonhjelm et al. ....... 708/405

FOREIGN PATENT DOCUMENTS

WO          WO9803014           6/1997

OTHER PUBLICATIONS

Kotzer et al, Phase Extraction Pattern Recognition:, Applied Optics, vol. 31, No. 8, Mar. 1992, pp. 1126–1137.
Kotzer et al, "Multiple–Object Input in Nonlinear Correlation", Applied Optics, vol. 32, No. 11, Apr. 1993, pp. 1919–1932.
Horner et al, "Pattern Recognition with Phase–Only Filters", Applied Optics, vol. 24, No. 5, Mar. 1985, pp. 609–611.
Horner et al, "Phase–Only Matched Filtering", Applied Optics, vol. 23, No. 6, Mar. 1984, pp. 812–816.
Ersoy et al., "Nonlinear Matched Filtering", J. Opt. Soc. Am. A, vol. 6, No. 5, May 1989, pp. 636–648.

* cited by examiner

*Primary Examiner*—Tan V. Mai
(74) *Attorney, Agent, or Firm*—Gregory L. Thorne

(57) ABSTRACT

An improved method and arrangement for detecting a watermark in an information (e.g. image or video) signal are disclosed. The detection is more reliable and less vulnerable to image processing by subjecting the suspect image (q) and the watermark to be detected (w) to Symmetrical Phase Only Matched Filtering (24–28,16) prior to detecting (29) the amount of correlation (d) between said signals.

8 Claims, 5 Drawing Sheets

WATERMARK DETECTION

FIELD OF THE INVENTION

The invention relates to a method of detecting a watermark in an information signal that has possibly been watermarked by modifying values of said information signal in accordance with (temporally or spatially) corresponding values of a watermark pattern. The invention also relates to an arrangement for detecting a watermark.

BACKGROUND OF THE INVENTION

A prior art method as defined in the opening paragraph is disclosed in International Patent Application WO-A-98/03014. The watermark is detected by computing the correlation of the suspect information signal with an applied watermark pattern, and comparing the correlation with a predetermined threshold. If the correlation is larger than the (threshold, the watermark is said to be present, otherwise it is said to be absent. The larger the correlation is, the more reliable the detection is and the more processing is allowed until the watermark can not be detected anymore. As disclosed in WO-A-98/03014, the information signal and/or the watermark pattern may be subjected to matched filtering before the correlation is computed. The reliability of the watermark detection is drastically improved thereby.

A problem of the prior art watermark detection method is that the (temporal or spatial) position of the watermark pattern with respect to the information signal is not absolutely known. If the position of the watermark applied to the detector differs from the location during embedding, the correlation will be small and the watermark can erroneously detected to be absent.

OBJECT AND SUMMARY OF THE INVENTION

It is an object of the invention to further improve the method of detecting a watermark.

This is achieved by the method defined in claim 1 and the arrangement defined in claim 6. Advantageous embodiments are defined in the subclaims.

The invention exploits the insight that the correlation of the information signal and the applied watermark for a number of possible positions of the watermark is best computed in the Fourier domain, and that the robustness and reliability of detection can be improved by applying Symmetrical Phase Only Matched Filtering (SPOMF) to the information signal and the watermark before correlation. SPOMF, which is known per se in the field of pattern recognition, postulates that most of the relevant information needed for correlation detection is carried by the phase of Fourier coefficients. In accordance herewith, the magnitudes of the complex Fourier coefficients are normalized to have substantially the same magnitudes.

Although the adjective "symmetrical" in the expression SPOMF refers to filtering both the information signal and the watermark, the inventors have found that normalizing the Fourier transformed information signal contributes most to the improvement of the correlation detection. Also normalizing the magnitudes of the Fourier transformed watermark constitutes an embodiment of the invention.

The step of normalizing the magnitude of complex Fourier coefficients includes dividing each Fourier coefficient by its absolute value. However, the inventors have found that the detection strength does not decrease significantly if each coefficient is divided by its real or imaginary part, depending on which is the largest. This yields a courser approximation for the normalization (the magnitudes will vary between 1 and $\sqrt{2}$), but reduces the number of calculations considerably.

DESCRIPTION OF PREFERRED EMBODIMENTS

For the sake of convenience, the watermarking scheme in accordance with the invention will be described as a system for attaching invisible labels to video contents but the teachings can obviously be applied to any other contents, including audio and multimedia. We will hereinafter often refer to this method as JAWS (Just Another Watermarking System).

Figure 1:
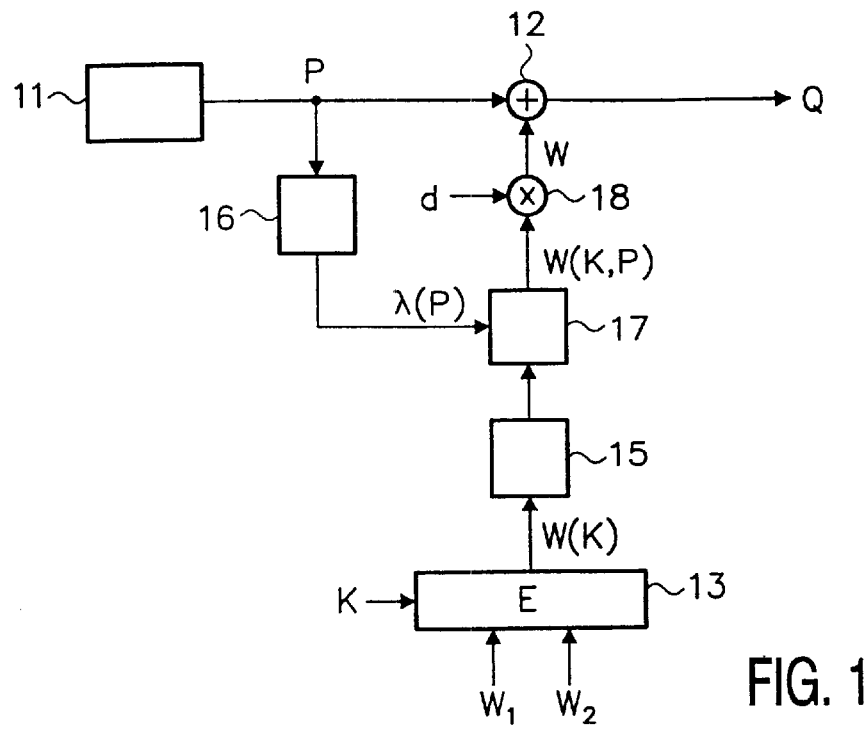
FIG. 1 shows schematically an arrangement for embedding a watermark in a signal.

FIG. 1 shows a practical embodiment of the watermark embedder to provide background information. The embedder comprises an image source 11 which generates an image P, and an adder 12 which adds a watermark W to the image P. The watermark W is a noise pattern having the same size as the image, e.g. $N_1$ pixels horizontally and $N_2$ pixels vertically. The watermark W represents a key K, i.e. a multi-bit code which is to be retrieved at the receiving end.

Figure 2:
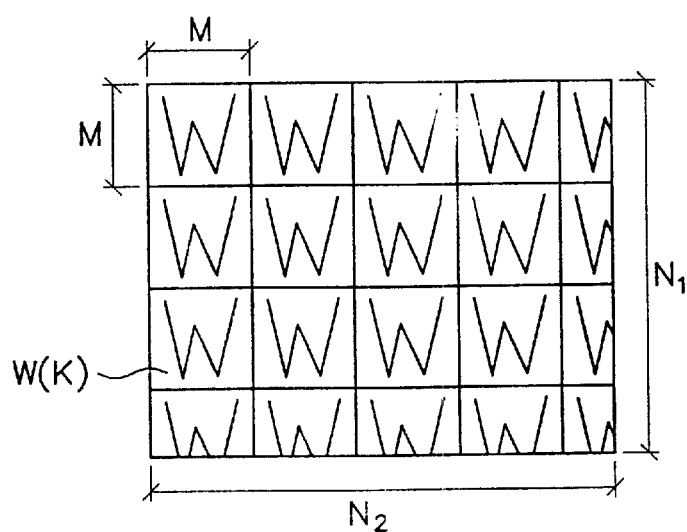
FIGS. 2 and 3 show diagrams to illustrate the operation of the embedder which is shown in FIG. 1.

To avoid that the watermark detection process needs to search the watermark W over the large $N_1 \times N_2$ space, the watermark is generated by repeating, and if necessary truncating, smaller units called "tiles" W(K) over the extent of the image. This "tiling" operation (15) is illustrated in FIG. 2. The tiles W(K) have a fixed size M×M. The tile size M should not be too small: smaller M implies more symmetry in W(K) and therefore a larger security risk. On the other hand M should not be too large: a large value of M implies a large search space for the detector and therefore a large complexity. In JAWS we have chosen M=128 as a reasonable compromise.

Then, a local depth map or visibility mask $\lambda(P)$ is computed (16). At each pixel position, $\lambda(P)$ provides a measure for the visibility of additive noise. The map $\lambda(P)$ is constructed to have an average value equal to 1. The extended sequence W(K) is subsequently modulated (17) with $\lambda(P)$, i.e. the value of the tiled watermark W(K) at each position is multiplied by the visibility value of $\lambda(P)$ at that position. The resulting noise sequence W(K,P) is therefore dependent on both the key K and the image content of P. We refer to W(K,P) as an adaptive watermark as it adapts to the image P.

Finally, the strength of the final watermark is determined by a global depth parameter d which provides a global scaling (18) of W(K,P). A large value of d corresponds to a robust but possibly visible watermark. A small value corresponds to an almost imperceptible but weak watermark. The actual choice of d will be a compromise between the robustness and perceptibility requirements. The watermarked image Q is obtained by adding (12) W=d×W(K,P) to P, rounding to integer pixel values and clipping to the allowed pixel value range.

Figure 3:
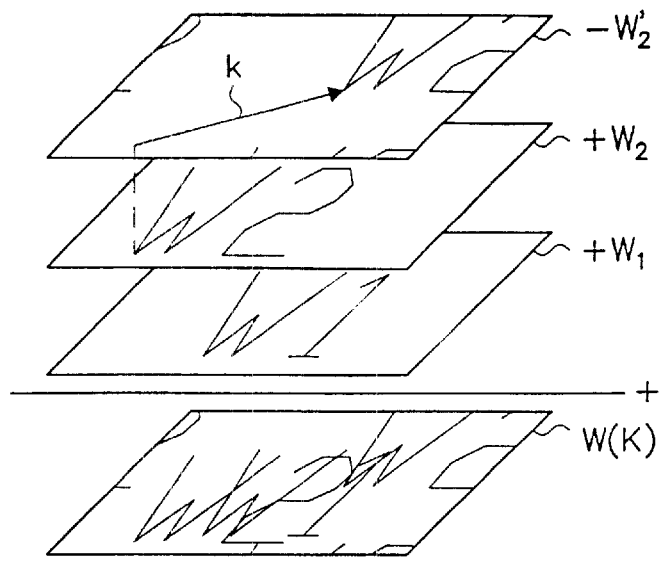

In order to embed the multi-bit code K in the watermark W, every tile W(K) is built up from a limited set of uncorrelated basic or primitive tiles $\{W_1 \ldots W_n\}$ and shifted versions thereof, in accordance with $$W(K) = \sum_{i,j} s_{i,j} \text{shift}(W_i, k_{i,j})$$

where "shift($W_i$, $k_{ij}$)" represents a spatial shift of a basic M*M tile $W_i$ over a vector $k_{ij}$ with cyclic wrap around. The signs s∈{−1,+1} and the shifts k depend on the key K via an encoding function E (13). It is the task of the detector to reconstruct K after retrieving the signs $s_i$ and the shifts $k_i$. Note that each basic tile $W_i$ may occur several times. In FIG. 1, the encoder 13 generates W(K)=$W_1$+$W_2$−$W_2$' where $W_2$' is a shifted version of $W_2$. FIG. 3 illustrates this operation.

Figure 4:
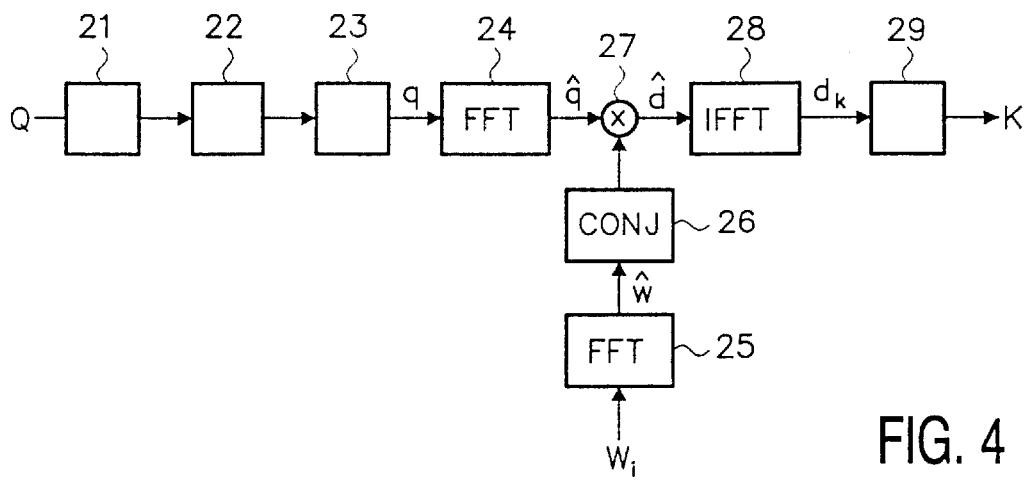
FIG. 4 shows schematically an arrangement for detecting the embedded watermark.
Figure 5:
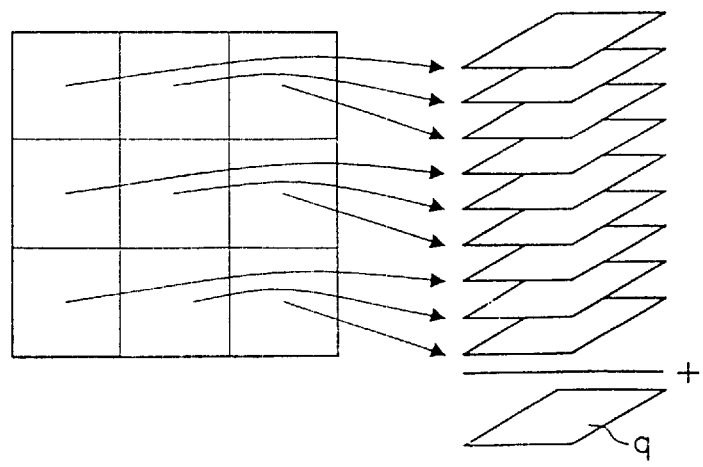
FIGS. 5, 6A and 6B show diagrams to illustrate the operation of the detector which is shown in FIG. 4.

FIG. 4 shows a schematic diagram of a watermark detector. The watermark detector receives possibly watermarked images Q. Watermark detection in JAWS is not done for every single frame, but for groups of frames. By accumulating (21) a number of frames the statistics of detection is improved and therefore also the reliability of detection. The accumulated frames are subsequently partitioned (22) into blocks of size M×M (M=128) and all the blocks are stacked (23) in a buffer q of size M×M. This operation is known as folding. FIG. 5 illustrates this operation of folding.

The next step in the detection process is to assert the presence in buffer q of a particular noise pattern. To detect whether or not the buffer q includes a particular watermark pattern W, the buffer contents and said watermark pattern are subjected to correlation. Computing the correlation of a suspect information signal q with a watermark pattern w comprises computing the inner product d=<q,w> of the information signal values and the corresponding values of the watermark pattern. For a one-dimensional information signal q={$q_n$} and watermark pattern w={$w_n$}, this can be written in mathematical notation as:

$$d = \frac{1}{N}\sum_{n=1}^{N} q_n w_n,$$

For the two-dimensional M×M image q={$q_{ij}$} and watermark pattern W={$w_{ij}$}, the inner product is:

$$d = \frac{1}{M^2}\sum_{i=1}^{M}\sum_{j=1}^{M} q_{ij} w_{ij}.$$

In principle, the vector $k_i$ by which a tile $W_i$ has been shifted can be found by successively applying $W_i$ with different vectors k to the detector, and determining for which k the correlation is maximal. However, this brute force searching algorithm is time consuming. Moreover, the image Q may have undergone various forms of processing (such as translation or cropping) prior to the watermark detection, so that the detector does not know the spatial location of the basic watermark pattern $W_i$ with respect to the image Q.

Instead of brute force searching JAWS exploits the structure of the patterns W(K). The buffer q is examined for the presence of these primitive patterns, their signs and shifts. The correlation $d_k$ of an image q and a primitive pattern w being shifted by a vector k ($k_x$ pixels horizontally and $k_y$ pixels vertically is:

$$d_k = \frac{1}{M^2}\sum_{i=1}^{M}\sum_{j=1}^{M} q_{ij} w_{i+k_x, j+k_y}.$$

The correlation values $d_k$ for all possible shift vectors k of a basic pattern $W_i$ are simultaneously computed using the Fast Fourier transform. As shown in FIG. 4, both the contents of buffer q and the basic watermark pattern $W_i$ are subjected to a Fast Fourier Transform (FFT) in transform circuits 24 and 25, respectively. These operations yield:

$$\hat{q}=FFt(q)$$

and $$\hat{w}=FFt(w),$$

where $\hat{q}$ and $\hat{w}$ are sets of complex numbers.

Computing the correlation is similar to computing the convolution of q and the conjugate of $W_i$. In the transform domain, this corresponds to:

$$\hat{d}\hat{d}=\hat{q}\otimes \text{conj}(\hat{w})$$

where the symbol $\otimes$ denotes pointwise multiplication and conj( ) denotes inverting the sign of the imaginary part of the argument. In FIG. 4, the conjugation of $\hat{w}$ is carried out by a conjugation circuit 26, and the pointwise multiplication is carried out by a multiplier 27. The set of correlation values d={$d_k$} is now obtained by inverse Fourier transforming the result of said multiplication:

$$d=IFFT(\hat{d})$$

which is carried out in FIG. 4 by an inverse FFT circuit 28. The watermark pattern $W_i$ is detected to be present if a correlation value $d_k$ is larger than a given threshold.

Figure 6A:
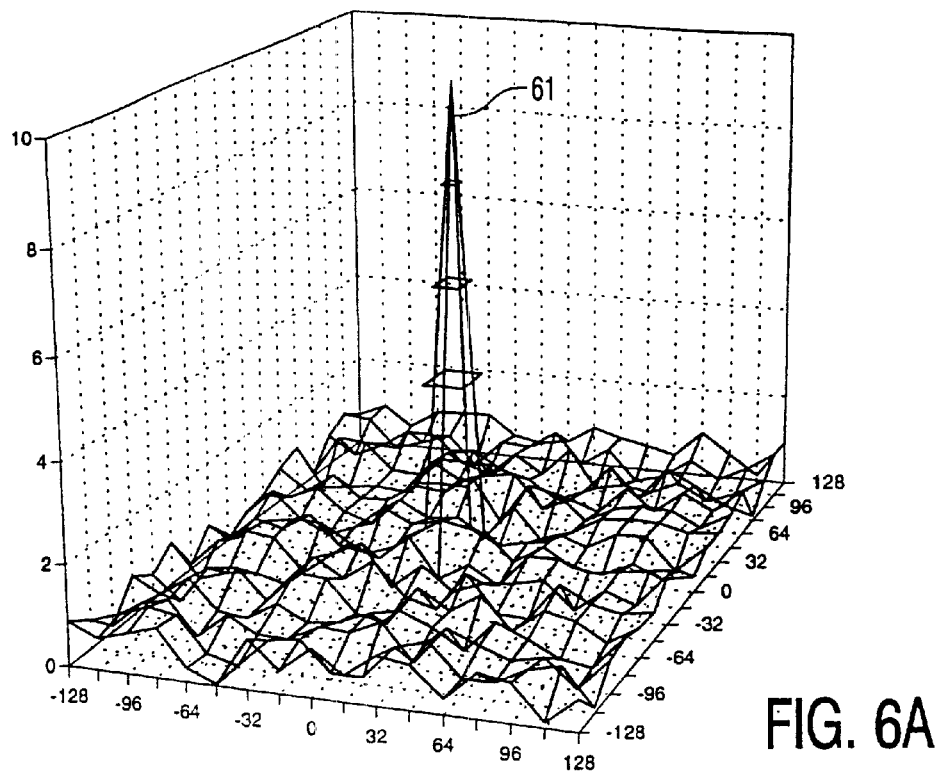
Figure 6B:
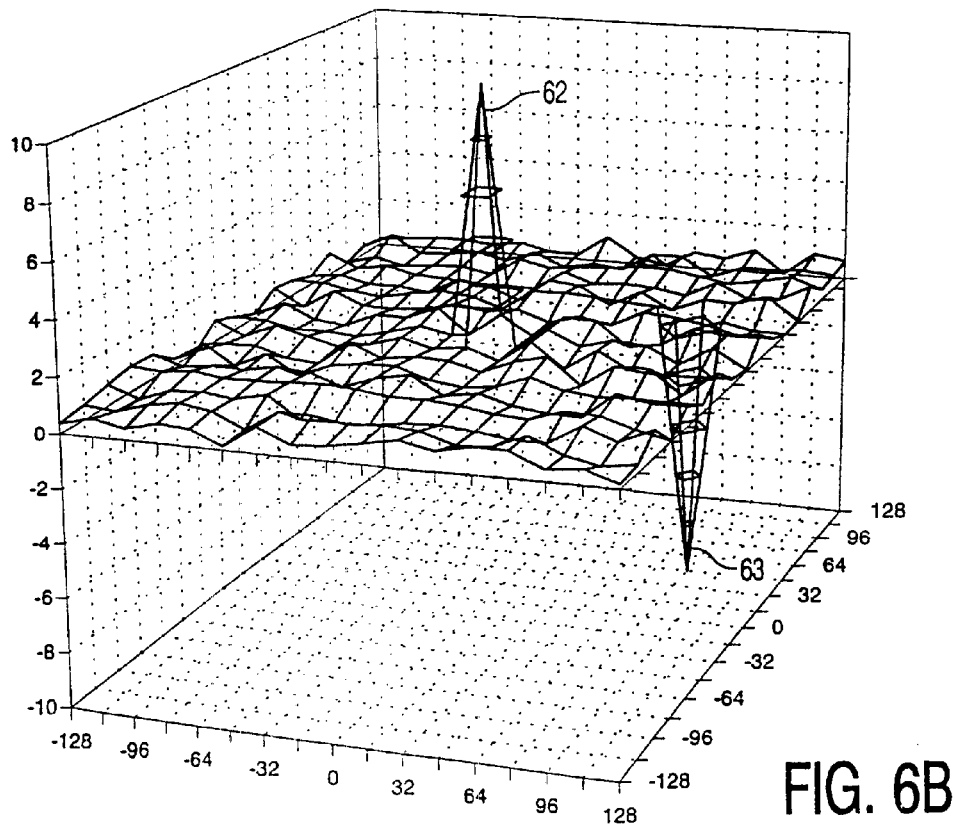

FIG. 6A shows a graph of correlation values $d_k$ if the presence of watermark pattern $W_1$ (see FIGS. 1 and 3) in image Q is being checked. The peak 61 indicates that $W_1$ is indeed found. The position (0,0) of this peak indicates that the pattern $W_1$ applied to the detector happens to have the same spatial position with respect to the image Q as the pattern $W_1$ applied to the embedder. FIG. 6B shows the graph of correlation values if watermark pattern $W_2$ is applied to the detector. Two peaks are now found. The positive peak 62 at (0,0) denotes the presence of watermark $W_2$, the negative peak 63 at (48,80) denotes the presence of watermark −$W_2$'. The relative position of the latter peak 63 with respect to peak 62 (or, what is similar, peak 61) reveals the relative position (in pixels) of $W_2$' with respect to $W_2$, i.e. the shift vector k. The embedded data K is derived from the vectors thus found.

Figure 7:
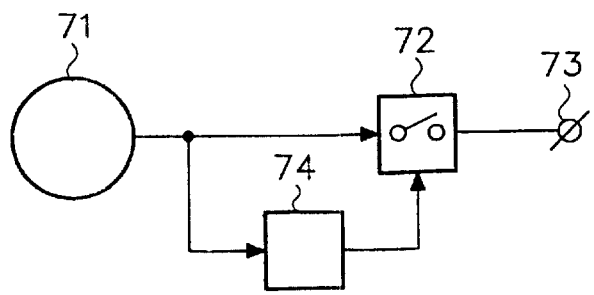
FIG. 7 shows a device for playing back a video bit stream with an embedded watermark.

The embedded information may identify, for example, the copy-right holder or a description of the content. In DVD copy-protection, it allows material to be labeled as 'copy once', 'never copy', 'no restriction', 'copy no more', etc. FIG. 7 shows a DVD drive for playing back an MPEG bitstream which is recorded on a disc 71. The recorded signal is applied to an output terminal 73 via a switch 72. The output terminal is connected to an external MPEG decoder and display device (not shown). It is assumed that the DVD drive may not play back video signals with a predetermined embedded watermark, unless other conditions are fulfilled which are not relevant to the invention. For example, watermarked signals may only be played back if the disc 71 includes a given "wobble" key. In order to detect the watermark, the DVD drive comprises a watermark detector 74 as described above. The detector receives the recorded signal and controls the switch 72 in response to whether or not the watermark is detected.

Figure 8:
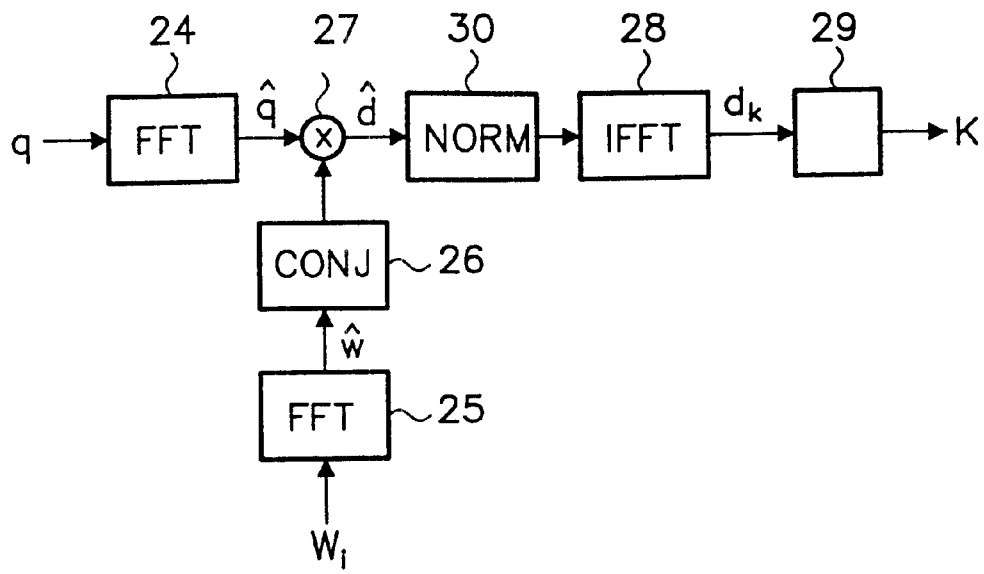
FIG. 8 shows schematically an embodiment of the arrangement for detecting the embedded watermark in accordance with the invention.

The Fourier coefficients $\hat{d}$ are complex numbers, that is, they have a real part and an imaginary part, or a magnitude and a phase. The inventors have found that the reliability of the detector is significantly improved if the magnitude information is thrown away and the phase is considered only. FIG. 8 shows an embodiment of the detector's correlation circuitry in accordance with the invention. The embodiment differs from the one shown in FIG. 4 in that a magnitude normalization circuit 30 has been inserted between the multiplier 27 and the inverse Fourier Transform circuit 28. The operation of the normalization circuit comprises pointwise dividing each coefficient by its magnitude. In mathematical notation:

$$\hat{d} := \hat{d} \Phi \text{abs}(\hat{d}) \quad (1)$$

where $\Phi$ denotes pointwise division and abs( ) denotes:

$$\text{abs}(\hat{d}_k) = \sqrt{R(\hat{d}_k)^2 + I(\hat{d}_k)^2} \quad (2)$$

where R( ) and I( ) denote the real and imaginary part of the argument, respectively.

Figure 9A:
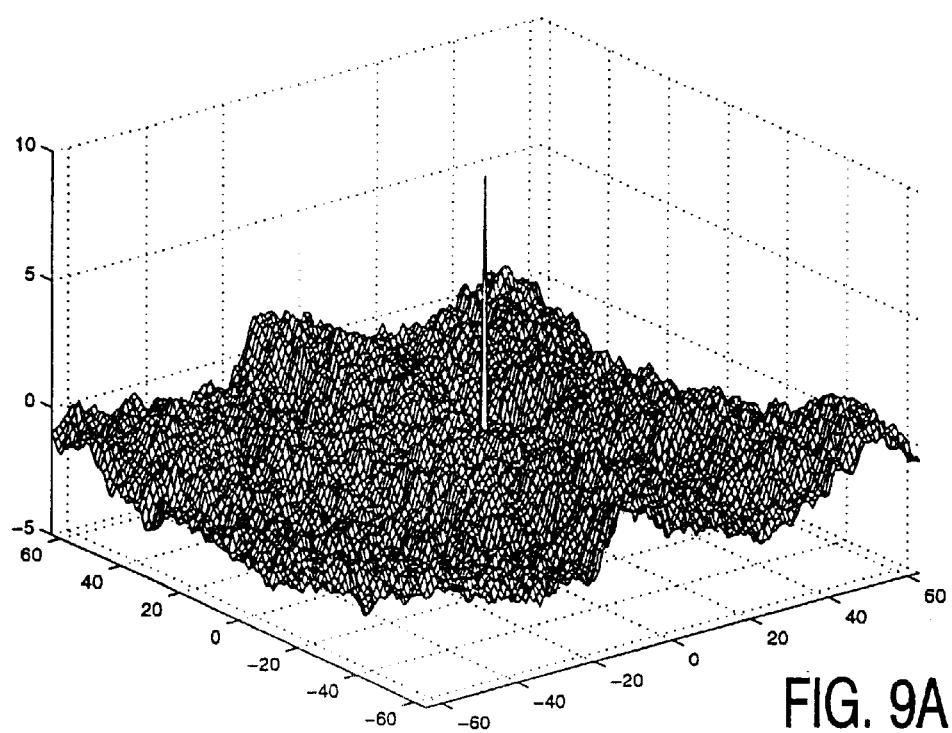
FIGS. 9A and 9B show diagrams to illustrate the operation of the detector which is shown in FIG. 8.
Figure 9B:
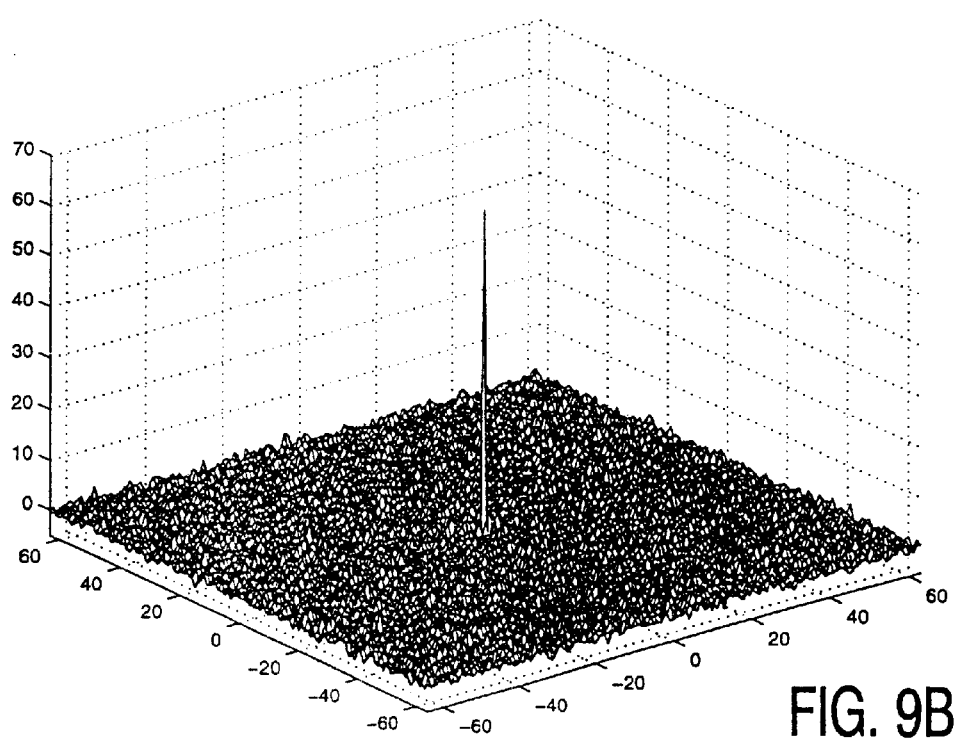

Said normalization of magnitudes is referred to as Symmetrical Phase Only Matched Filtering (SPOMF). FIGS. 9A and 9B illustrate the effect of SPOMF correlation. More particularly, FIG. 9A shows the correlation values $d_k$ when using linear correlation, i.e. without the magnitude normalization circuit 30. The correlation value $d_{00}$, expressed in units of standard deviation of the whole matrix, amounts to 9.79. FIG. 9B shows the correlation values when using SPOMF correlation. The correlation value $d_{00}$ is now 62.77 times the standard deviation. It will be appreciated that the peak in FIG. 9B can more reliably be detected than the peak in FIG. 9A.

Figure 10:
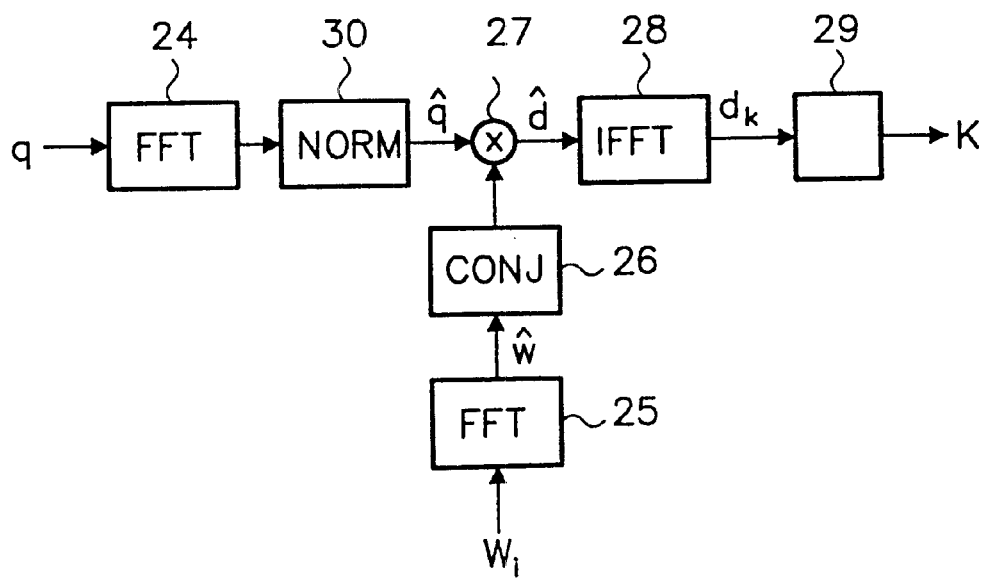
FIG. 10 shows schematically a further embodiment of the arrangement for detecting the embedded watermark in accordance with the invention.

Because normalizing the magnitudes of $\hat{d}$ is equivalent to normalizing the magnitudes of both $\hat{q}$ and $\hat{w}$, the normalization circuit 30 in FIG. 8 may be replaced by two normalization circuits after the FFT circuits 24 and 25. However, the embedded watermark will already have a reasonably white (flat) frequency spectrum because it is a pseudo-random noise pattern in practice, in which each sample is independently and identically drawn from a normal distribution. In view hereof, normalizing the magnitude of the information signal only has been found to suffice. FIG. 10 shows such an embodiment. The magnitude normalization circuit 30 is now located between the FFT circuit 24 and the multiplier 27. In this embodiment, the magnitudes of $\hat{d}$ are not exactly, but substantially, the same.

It should further be noted that the FFT and the conjugation of the applied watermark $W_i$ (c.f. circuits 25 and 26, respectively, in FIGS. 4, 8 and 10), as well as the optional normalization of the magnitudes of $\hat{w}$, can be pre-computed and stored in a memory.

The inventors have further found that the detection strength does not decrease significantly if a more course approximation for the normalization is used. Instead of dividing each Fourier coefficient by its magnitude as defined by equations (1) and (2), it suffices to divide each coefficient by its real or imaginary part, depending on which is the largest. The magnitudes will then vary between 1 and $\sqrt{2}$, the detection strength decreasing by 1% only. The advantage is saving of computational complexity, because the square root in equation (2) needs not be calculated. In such an embodiment, the normalization circuit 30 performs the following algorithm:

if $R(\hat{d}_k) \geq I(\hat{d}_k)$ then $\hat{d}_k := \hat{d}_k / R(\hat{d}_k)$ else $\hat{d}_k := \hat{d}_k / I(\hat{d}_k)$ where $\hat{d}_k$ is a complex Fourier coefficient of $\hat{d}$ (or $\hat{q}$ or $\hat{w}$ as the case may be), $R(\hat{d}_k)$ and $I(\hat{d}_k)$ are the real and imaginary part of $\hat{d}_k$, respectively, and / denotes division.

A further reduction of complexity can be obtained if the normalization includes divisions by only powers of 2. The magnitudes will then vary between 1 and $2\sqrt{2}$, the detection strength decreasing by 2.5%. Division by powers of 2 is particularly efficient in most common floating point number systems in which the real and imaginary parts of complex coefficients are represented as:

sign·mantissa·$2^{exp}$ where mantissa is a fixed point representation of a number between 1 and 2. The above normalization can now be simplified as follows:

if $\exp(R(\hat{d}_k)) \geq \exp(I(\hat{d}_k))$ then divider:=$\exp(R(\hat{d}_k))$ else divider:=$\exp(I(\hat{d}_k))$ $\exp(R(\hat{d}_k)) := \exp(R(\hat{d}_k)) - $divider $\exp(I(\hat{d}_k)) := \exp(I(\hat{d}_k)) - $divider In summary, an improved method and arrangement for detecting a watermark in an information (e.g. image or video) signal are disclosed. The detection is more reliable and less vulnerable to image processing by subjecting the suspect image (q) and the watermark to be detected ($W_i$) to Symmetrical Phase Only Matched Filtering (24–28,30) prior to detecting (29) the amount of correlation (d) between said signals.

What is claimed is:

1. A method of detecting a watermark in an information signal, comprising the steps of:

computing a value indicative of the correlation of said information signal and said watermark; and detecting whether said correlation value is larger than a predetermined threshold; wherein said computing comprises the steps of Fourier transforming the information signal and the watermark into respective Fourier coefficients, multiplying corresponding coefficients to obtain Fourier coefficients representing correlation values each corresponding with one of a plurality of positions of the watermark with respect to the information signal, and inverse transforming the Fourier coefficients representing the correlation values;

said step of detecting comprises detecting whether at least one of said correlation values is larger than the predetermined threshold;

the method further including the step of normalizing the Fourier coefficients representing the correlation values to substantially the same magnitudes.

2. A method as claimed in claim 1, wherein said step of normalizing is applied to the Fourier coefficients representing the information signal.

3. A method as claimed in claim 2, wherein said step of normalizing is further applied to the Fourier coefficients representing the watermark.

4. A method as claimed in claim 1, wherein said step of normalizing includes dividing each Fourier coefficient by its respective magnitude.

5. A method as claimed in claim 1, wherein said step of normalizing includes dividing each Fourier coefficient by its real or imaginary part depending on which is the largest.

6. A method as claimed in claim 5, wherein said dividing comprises dividing by a power of 2.

7. An arrangement for detecting a watermark (w) in an information signal (q), comprising:

means (24–28) for computing a value (d) indicative of the correlation of said information signal and said watermark; and means (29) for detecting whether said correlation value is larger than a predetermined threshold; wherein said computing means comprise means (24,25) for Fourier transforming the information signal and the watermark into respective Fourier coefficients, means (27) for multiplying corresponding coefficients to obtain Fourier coefficients representing correlation values each corresponding with one of a plurality of positions of the watermark with respect to the information signal, and means (28) for inverse transforming the Fourier coefficients representing the correlation values;

said detecting means (29) are arranged to detect whether at least one of said correlation values is larger than the predetermined threshold;

the arrangement further including means (30) for normalizing the Fourier coefficients representing the correlation values to substantially the same magnitudes.

8. A device for recording and/or playing back an information signal, comprising means (72) for disabling recording and/or playback of the video signal in dependence upon the presence of a watermark in said signal, wherein the device comprises an arrangement (74) for detecting said watermark in the signal as claimed in claim 7.

* * * * *